Dec. 12, 1972 HANS-GEORG SANDER 3,706,034
MOVING COIL MEASURING INSTRUMENT
Filed Jan. 22, 1971

INVENTOR
HANS-GEORG SANDER
BY
ATTORNEY.

United States Patent Office 3,706,034
Patented Dec. 12, 1972

3,706,034
MOVING COIL MEASURING INSTRUMENT
Hans-Georg Sander, Steinbach, Germany, assignor to VDO Tachometer Werke Adolf Schindling GmbH, Frankfurt am Main, Germany
Filed Jan. 22, 1971, Ser. No. 108,726
Claims priority, application Germany, Jan. 23, 1970, G 70 02 264.9; Austria, Feb. 2, 1970, A 944/70; Feb. 9, 1970, A 1,158/70
Int. Cl. G01r 1/00, 1/14
U.S. Cl. 324—154 R        13 Claims

ABSTRACT OF THE DISCLOSURE

A moving coil measuring instrument, which comprises an axle having a projecting arm. A moving coil is secured to the projecting arm. An annular core is surrounded by the moving coil, and at least one spiral spring and the moving coil are adjustable against the force of the spiral spring. The spiral spring is operatively connected with the ends of the moving coil. An insulating disc is disposed adjacent the spiral spring, and a layer of soft elastic material and dampening axial oscillations of the spiral spring is applied selectively to the disc or to one side of the spiral spring.

---

The present invention relates to a moving coil measuring instrument, in general and to such instrument having a current feed to the moving coil by means of at least one spiral spring on two spiral springs disposed on top of each other and effective as return adjusting springs and with an insulating disc between the two current feeding spiral springs, in particular. The moving coil measuring instrument of the present invention relates in particular to devices, which are subjected to continuous shocks or vibrations, which is the case, by example, in measuring devices for automotive vehicles.

In view of axial oscillations of the two spiral springs which are possible by the vibration such measuring instruments must have between these springs an insulating separating disc, in order to exclude a short-circuit the moving coil by engagement of the two current feeding springs. Since this intermediate disc secured to the axle of the measuring instrument must, however, have a certain stiffness and must therefore be made of a corresponding working material, the drawback of abutment noises of the spiral springs is experienced, which can occur in particular in vehicles with a motor having a high number of revolutions as unfavorable distortion noises. The oscillation caused by the shocks of a spiral-shaped measuring spring are knowingly not only effective in their movement plane in its shock-free state, rather have always also a certain swinging component perpendicularly to their movement plane.

It is one object of the present invention to provide a moving coil measuring instrument in which the distortion noises are avoided by providing on the insulating intermediate disc a soft-elastic layer, dampening the axial oscillations of the spiral springs. As particularly advantageous and effective, results a dampening layer comprising a plurality of fine short elastic fibers secured to the disc individually, which are secured by the electrostatic application of flocks on the intermediate disc perpendicularly or substantially perpendicularly to the intermediate disc. By such velvet-type layer a complete noise abating and simultaneously a dampening of the oscillations of the spiral springs is brought about.

It is another object of the present invention to provide a spirally shaped measuring spring bent into a plurality of windings, which operate as counter- and return springs to the adjustment force of measuring instruments or which serve as balance springs for the control of the run of timing instruments, in particular, for devices exposed to continuous jolts or vibrations. Such spirally shaped bent springs are used as measuring springs or balance springs to a great extent, also for measuring instruments and time pieces which are built into automotive vehicles. By the development of the simple structure for automotive vehicles on the one hand and vehicle motors having a great number of revolutions on the other hand, in such automotive vehicles vibrations could occur, which may have as a consequence resonance oscillations of these spiral springs in the built-in devices. In such oscillations the individual windings of the spring engage each other and can cause a more or less audible singing noise which can be disturbing in particular in vehicles of high quality, which are very silent during operations.

It is, therefore, still another object of the present invention, to provide a spirally shaped bent measuring spring in which a thin layer of soft elastic material is provided preferably on the innerside or the outerside of the windings, over the entire surface or partially rigidly applied. By such layer resonances oscillations of the measuring springs released by the vibrations are dampened in the plane of the windings and a noise formation by metallic engagement is avoided. A complete soft-elastic layer influences the spring constant, which can be considered during gauging thereof. Since, however, this influence can be varied in case of temperature variations it is suitable to apply the elastic layer only partially, that means possibly divided into points. A particularly advantageous partially divided soft-elastic layer is obtained, if in accordance with the further features of the present invention, the layer comprises a plurality of short thin fibers of elastic material, which are secured to the spring and individually. In addition, on the spring band at first a layer of hardening glue and on the latter a plurality of short thin fibers are applied by electrostatic application of flocks. If the glue is applied divided on points, one obtains after the application of the flocks a dampening layer between the spring windings, which influences the spring constant of the measuring spring only to a very slightly neglectable extent, practically independent from temperature variations.

It is yet, another object of the present invention to provide an apparatus for dampening of oscillations of a measuring spring bent in a plurality of windings spirally, the oscillations being excited by jolting, which measuring spring operates by example, as counter-and return spring of the setting force of measuring instruments in measuring devices or as a balance spring for control of a timing device. In accordance with the present invention a disc is provided disposed parallel to the movement plane in the jolting-free state of the measuring spring, on which disc is provided a layer of a plurality of thin soft elastic fibers, which individually substantial perpendicularly extend towards the disc and are secured to the latter and the free ends of which are adjacent to the measuring spring. It has been shown, that the oscillations of the spiral spring caused by shocks become effective not only in the movement plane in the jolting-free state of the spring, rather always also an oscillation component is excited perpendicularly to this movement plane. If winding parts of the spiral spring are moved outwardly by joltings from the movement plane and thereby come into engagement with the adjacent soft elastic fibers of the disc they slide on the latter and the swing oscillation is thereby immediately disturbed and dampened in its resonance. By the dampening the winding parts of the spiral spring come again out of engagement with the fibers of the plate and an interference of the spring effect, which occurs with each resonance oscillation is removed. By suitable selection and dimensioning of the fibers, the distance from the movement plane of the spiral spring and the distribution denseness of the fibers on the disc, the dampening effect of the given requirements can be extensively adjusted and set.

With these and other objects in view which will become apparent in the following detailed description, the present invention will be clearly understood in connection with the accompanying drawings, in which.

Figure 1:
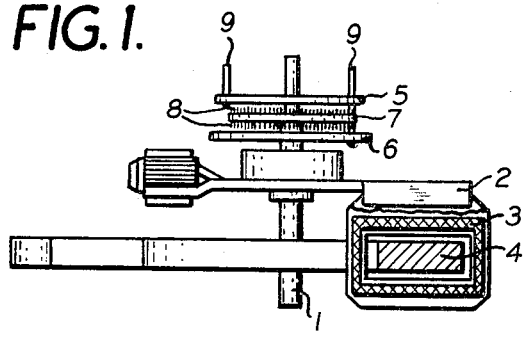
FIG. 1 is a side elevation of a first embodiment of the present invention.
Figure 2:
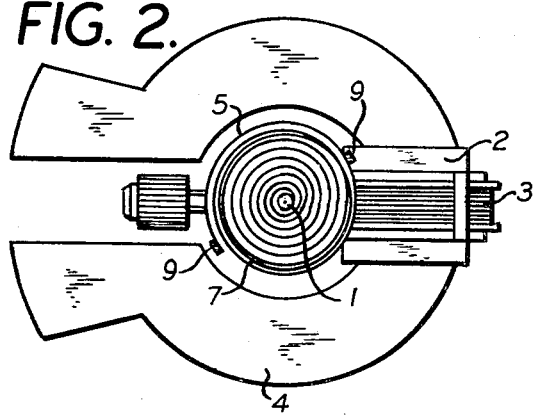
FIG. 2 is a top plan view of the device shown in FIG. 1.

Referring now to the drawings and in particular to FIGS. 1 and 2, the moving coil measuring instrument designed in accordance with the present invention comprises an axle 1 carrying a moving coil and a magnet core, as well as the current feeding spiral springs with a separating disc are clearly disclosed. The moving coil 3 is secured to the measuring instrument axle 1 by means of a projecting arm 2, which moving coil 3 surrounds the annular core 4 and is adjustable about the latter against the force of the two spiral springs 5 and 6. The current feed to the two spiral springs 5 and 6 connected with the ends of the moving coil 3 takes place by the electric conduits 9 secured in the instrument. In order to exclude an engagement of the two spiral springs 5 and 6 in case of axial oscillations between the latter, an insulating disc 7 is secured on the axle 1, on which disc 7, in accordance with the present invention, for the dampening of the abutment noises and of the axial oscillations, a soft elastic resilient layer 8 is provided, which comprises by example, flocks with a plurality of fine short elastic fibers. The application of this layer 8 takes place by electrostatic flocking, whereby the fine short fibers are secured in a hardening glue layer on the disc 7.

Figure 3:
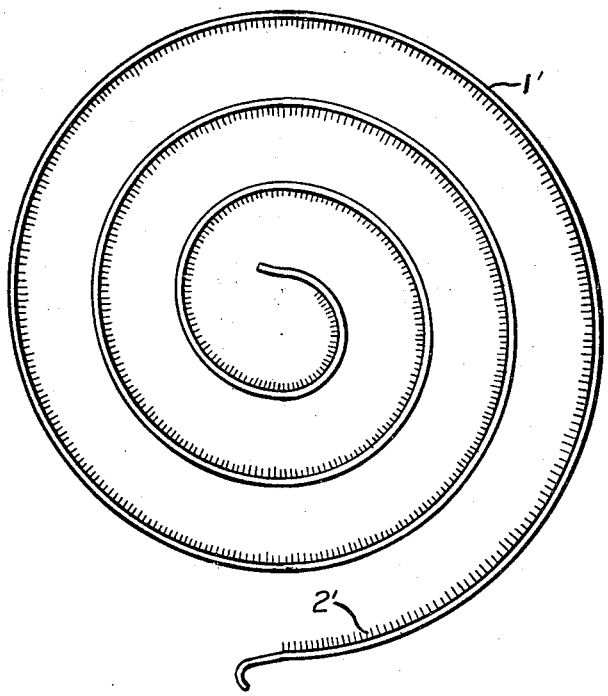
FIG. 3 is a top plan view of a measuring spring with a dampening layer.
Figure 4:
FIG. 4 is a front elevation of a part of a spring disclosing one variation of the dampening layer.
Figure 5:
FIG. 5 is an elevation of a portion of a spring with a different arrangement of the applied layer.

Referring now again to the drawings and in particular to FIGS. 3 to 5, the embodiment disclosed therein comprises a spring band 1' which is bent to form a spiral and which carries on the inside of the windings a velvet like layer 2' comprising a plurality of short thin fibers of elastic working material, which are secured individually by electrostatic application of flocks on the spring band 1. FIG. 4 shows a portion of the spring band 1 on which preferably again on the inside equally divided small particles of a soft elastic working material, for instance, rubber is applied. FIG. 5 discloses a portion of a spring band $1^2$ with a partial flock application, whereby at first a pointedly divided glue $4^2$ is applied in which the electrostatically applied fibers $5^2$ are secured, by hardening of the glue $4^2$ on the spring band $1^2$, perpendicularly to the latter or approximately perpendicularly.

Figure 6:
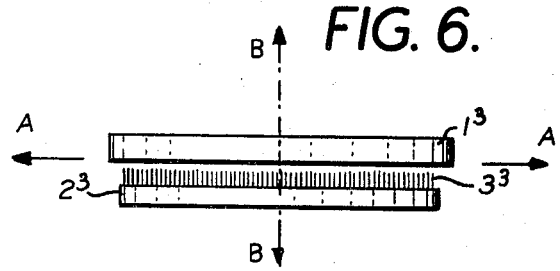
FIG. 6 is a side elevation of another embodiment of the present invention.
Figure 7:
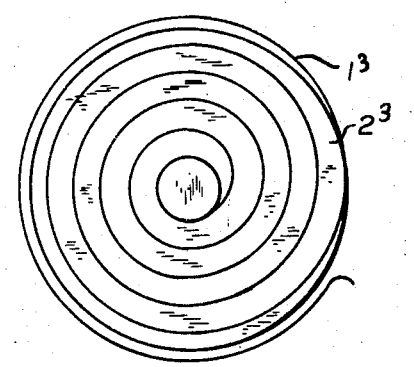
FIG. 7 is a top plan view of the spring disclosed in FIG. 6.

Referring now again to the drawings and in particular to FIGS. 6 and 7, it will be found that a disc $2^3$ is disposed parallel to the movement plane A of the spiral spring $1^3$. On the side of the disc $2^3$ pointing towards the spring $1^3$, a layer $3^3$ is provided which consists of a plurality of thin soft elastic fibers, which are secured to the latter individually, perpendicular or about perpendicular to the disc 2 and the free ends of which are adjacent the measuring spring $1^3$. This velvet like layer $2^3$ is produced by electrostatic application of flocks on the disc $2^3$, whereby at first glue or the like is applied to the disc $2^3$ in which the electrostatically flocked fibers are secured by hardening. In case of a shock of the spring, it is known, that always also an oscillation component in the direction B is experienced. By this shock at least parts of the windings of the spring $1^3$ get into engagement with the fibers of the layer $3^3$ and the oscillation is immediately dampened.

While I have disclosed several embodiments of the present invention it is to be understood that these embodiments are given as example and not in a limiting sense.

I claim:

1. A moving coil measuring instrument, comprising:
an axle having a projecting arm,
a moving coil secured to said projecting arm,
an annular core surrounded by said moving coil,
at least one spiral spring and said moving coil being adjustable against the force of said spiral spring,
said spiral spring being operatively connected with the ends of said moving coil,
an insulating disc adjacent said spiral spring, and
a layer of soft elastic material and dampening axial oscillations of said spiral spring applied selectively to said disc or to one side of said spiral spring.

2. The instrument, as set forth in claim 1, wherein:
said dampening layer comprises a plurality of short, elastic and individual fibers secured to said disc in form of flocks.

3. The instrument, as set forth in claim 1, wherein:
said layer is applied to said disc.

4. The instrument, as set forth in claim 1, wherein:
said spiral spring has a plurality of windings, and
said layer of soft elastic material is applied to one side of said spiral spring.

5. The instrument, as set forth in claim 4, wherein:
said layer comprises a plurality of short, thin fibers of elastic material individually secured to said spring.

6. The instrument, as set forth in claim 5, which includes:
a layer of hardenable glue material, and
said layer of soft elastic material is secured to said first mentioned layer.

7. An appartus for dampening of oscillations excited by shocks of a spiral measuring spring, as set forth in claim 1, comprising:
said disc disposed parallel to the movement plane in the shock-free state of said measuring spring,
said layer of soft elastic material is secured to said disc and
said fibers are disposed with their ends adjacent said measuring springs.

8. The apparatus, as set forth in claim 7, wherein:
said layer is of a velvet type including a plurality of elastic fibers.

9. A measuring device comprising:
a measuring spring means bent spirally in a plurality of windings, and counter-acting, as a counterspring, setting forces of the measuring device, particularly for being subjected to continuous shocks, and
a layer of soft elastic material provided selectively at least partly on said measuring spring means, and parallel to its swinging plane in its shock-free state closely adjacent to the latter, respectively.

10. The measuring device, as set forth in claim 9, wherein:
said soft-elastic material comprises a plurality of short, thin fibers of elastic material which are secured individually and at least substantially vertically standing on said measuring spring means.

11. The measuring device, as set forth in claim 9, further comprising:
a carrier disposed parallel to the swinging plane of said measuring spring means, and
said soft-elastic material comprises a plurality of short, thin fibers of elastic material which are secured individually and at least substantially vertically standing on said carrier.

12. The measuring device, as set forth in claim 10, wherein:
said soft-elastic material is velvety and applied by electrostatic flocking on said measuring spring means.

13. The measuring device, as set forth in claim 11, wherein:
said soft-elastic material is velvety and applied by electrostatic flocking on said carrier.

References Cited
UNITED STATES PATENTS
1,623,915   4/1927   Foster _____ 324—155

ALFRED E. SMITH, Primary Examiner

U.S. Cl. X.R.
324—125